Patented Jan. 21, 1941

2,229,219

UNITED STATES PATENT OFFICE 2,229,219

MANUFACTURE OF NITRILES OF LOWER ALIPHATIC ACIDS

Horace Finningley Oxley and Edward Boaden Thomas, Spondon, near Derby, England, assignors to Celanese Corporation of America, a corporation of Delaware No Drawing. Application October 7, 1936, Serial No. 104,558. In Great Britain October 10, 1935

9 Claims. (Cl. 260—464)

This invention relates to the manufacture of organic compounds, and is more particularly concerned with the manufacture of nitriles.

According to the present invention, nitriles, and particularly aliphatic acid nitriles, are produced by dehydration of ammonium salts of the corresponding acids under the action of heat. The production of acetonitrile, which is an important embodiment of the invention, is thus effected by the dehydration of ammonium acetate.

In carrying out the process of the invention the ammonium salt to be decomposed may be heated under a fractionating column under conditions such that the nitrile will distil off as it is produced. It has been found preferable to have present in the free state a quantity of the same acid as that combined in the ammonium salt, as by this means distillation of ammonia, which recombines with the acid in the receiver, can be minimised or even eliminated. Usually a quantity of free acid equal to about 40-60% of that combined in the ammonium salt is sufficient to avoid the presence of substantial quantities of unchanged ammonium salt in the distillate. Larger quantities of acid may be employed, if desired, although it is found that no advantage is secured by using a quantity of free acid greater than that combined in the salt.

In practice it has been found that the quantity of free acid thus employed may be reduced very substantially by carrying out the production of the nitrile as a continuous operation. This object may be achieved by heating the mixture of ammonium salt and free acid to the decomposition temperature under a fractionating column, operated so as to permit distillation into a suitable receiver of the nitrile as it is formed, and providing a continuous supply of fresh ammonium salt-acid mixture to the distillation vessel. Operating in this manner it has been found possible to obtain excellent results by supplying to the distillation vessel a mixture containing free acid equal to 15-20% of that combined in the ammonium salt. Such a mixture may be maintained in a liquid form suitable for continuous feeding by warming, e. g., to a temperature of 60-70° C.

In such a process the distillation vessel may, if desired, be charged initially with a mixture containing a rather larger proportion of free acid than is present in the mixture continuously supplied; for instance the vessel may be charged with a mixture containing free acid in quantity equal to 20-50% of the weight of the acid combined in the ammonium salt employed.

The decomposition temperature employed may be varied according to the particular nitrile to be produced, and according to other operating conditions. In general, temperatures of 200-220° C. are very suitable for the production of acetonitrile, temperatures of 200-210° C. being very satisfactory. Where, as will usually be the case in practice, the distillation is effected under a fractionating column, the head of the column should be maintained at a temperature such that the nitrile distils over while the free acid is as far as possible returned to the distillation vessel. In the production of acetonitrile a still-head temperature of about 92° C. has been found very satisfactory in practice.

It has been found that the production of the nitriles can be accelerated very considerably by the use of suitable catalysts, among which iron may be mentioned as being particularly effective. The iron may be introduced into the distillation vessel in the form of a compound and phosphates of iron, e. g. $Fe(H_2PO_4)_3$ have been found very suitable for use in this manner. Alternatively, a distillation vessel made of a corrosive-resistant ferrous alloy such as Staybrite may be employed, in which case it is found that the small amount of corrosion which does take place is sufficient to provide the iron catalyst.

Separation of the nitrile produced from the distillate obtained may be effected in any desired manner, for instance by fractional distillation, if desired, after the addition of sufficient acetic acid to convert all the acetate present into acid acetate and thus prevent distillation of ammonia.

It has been found, however, that aqueous nitriles contaminated with the ammonium salt of the corresponding acid, such as are obtained in the process of the present invention, may be purified very efficiently by a process comprising salting out the nitrile with the ammonium salt by neutralising with ammonia free acid contained in the crude nitrile and, if necessary, adding a further quantity of the ammonium salt. This method of separating a nitrile from admixture with the ammonium salt of the corresponding acid is broadly novel.

Such a salting out process produces in the case of acetonitrile an upper layer of aqueous nitrile of 95% concentration, which, on fractionation, yields first a constant boiling nitrile-water mixture containing 84% nitrile and subsequently the anhydrous nitrile. It is possible by this means to obtain the bulk of the nitrile contained in the crude product in an anhydrous condition.

Fractionation of the ammonium acetate layer from the salting out operation yields a distillate consisting of aqueous nitrile containing free ammonia which can be used in neutralising a further batch of crude nitrile, and so likewise can ammonia obtained from the 84% nitrile obtained by fractionating the salted out product. The residue from the fractionation of the ammonium acetate layer consists of ammonium acetate and the acid acetate and is available for use as starting material in the production of a further quantity of nitrile.

While the invention has been described above more particularly with regard to the manufacture of acetonitrile it is not limited in this respect and may be applied to the manufacture of other nitriles. For example, by employing ammonium propionate as starting material propionitrile may be produced and likewise from ammonium butyrate there may be obtained butyronitrile.

The following example illustrates the invention as applied to the production of acetonitrile:

*Example*

A mixture of about 88% ammonium acetate and 12% acetic acid, prepared by adding acetic acid to ammonium carbonate, is continuously fed to a still provided with a Vigreux column and containing either a quantity of the feed mixture or a residue from a previous operation. During the process the base is maintained at a temperature of 203-209° C. and the head at a temperature of 90-95° C.

The acetonitrile formed is salted out by neutralising the aqueous distillate with ammonium carbonate whereupon a separation into two layers occurs.

The upper layer, containing the bulk of the acetonitrile formed together with only a trace of ammonium acetate, is separated and fractionally distilled using a column with a dephlegmator and employing a reflux ratio of about 2:1. About one third (by weight) of the liquid distils at about 75-77 C., the distillate, which contains about 84% acetonitrile and 1-2% ammonium acetate, being added to the next batch prior to salting out. The residue form the distillation consists of approximately 99% acetonitrile.

The lower layer from the salting out contains about 5% acetonitrile and about 70% ammonium acetate, and when submitted to rapid fractionation yields first (below 80° C.) a small quantity of 80% acetonitrile which is strongly ammoniacal and later dilute ammonia. When about one half or rather less has been distilled the residue consists essentially of ammonium acid acetate. These products are introduced into the cycle at suitable stages in the process, the dilute aqueous ammonia being first brought to the boil and the evolved ammonia absorbed in acetic acid.

Having described our invention what we desire to secure by Letters Patent is:

1. A continuous process for the manufacture of the nitrile of a lower aliphatic acid, which comprises heating a liquid reaction medium comprising the ammonium salt of said acid mixed with a quantity of said acid in the free state equal to 20 to 60% of the weight of acid combined in said ammonium salt, so as to form the nitrile by decomposition of the ammonium salt, and to distill off the nitrile as it is produced, and continuously supplying to the decomposition zone a mixture of the ammonium salt and free acid, the free acid being present in the latter mixture in an amount equal to 15 to 20% by weight of that combined in the ammonium salt.

2. Process for the manufacture of the nitrile of a lower aliphatic acid, which comprises heating a liquid reaction medium comprising the ammonium salt of said aliphatic acid in admixture with a quantity of the same acid equal to 40-60% by weight of that combined in the ammonium salt so as to form the nitrile by decomposition of the ammonium salt and to distil off the nitrile as it is produced.

3. A continuous process for the manufacture of the nitrile of a lower aliphatic acid, which comprises heating a liquid reaction medium comprising the ammonium salt of said acid mixed with a quantity of said acid in the free state equal to 20 to 50% of the weight of acid combined in said ammonium salt, so as to form the nitrile by decomposition of the ammonium salt, and to distill off the nitrile as it is produced, and continuously supplying to the decomposition zone a mixture of the ammonium salt and free acid, the free acid being present in the latter mixture in an amount equal to 15 to 20% by weight of that combined in the ammonium salt.

4. Process for the manufacture of the nitrile of a lower aliphatic acid, which comprises heating, in presence of an iron catalyst, a liquid reaction medium comprising the ammonium salt of said aliphatic acid in admixture with a quantity of the same acid equal to 40-60% by weight of that combined in the ammonium salt so as to form the nitrile by decomposition of the ammonium salt and to distill off the nitrile as it is produced.

5. A continuous process for the manufacture of the nitrile of a lower aliphatic acid, which comprises heating, in the presence of an iron catalyst, a liquid reaction medium comprising the ammonium salt of said acid mixed with a quantity of said acid in the free state equal to 20 to 50% of the weight of acid combined in said ammonium salt, so as to form the nitrile by decomposition of the ammonium salt, and to distill off the nitrile as it is produced, and continuously supplying to the decomposition zone a mixture of the ammonium salt and free acid, the free acid being present in the latter mixture in an amount equal to 15 to 20% by weight of that combined in the ammonium salt.

6. Process for the manufacture of acetonitrile, which comprises heating a liquid reaction medium comprising ammonium acetate in admixture with a quantity of free acetic acid equal to 40-60% by weight of that combined in the ammonium acetate so as to form acetonitrile by decomposition of ammonium acetate and to distil off the acetonitrile as it is produced.

7. A continuous process for the manufacture of acetonitrile, which comprises heating a liquid reaction medium comprising ammonium acetate mixed with a quantity of free acetic acid equal to 20 to 50% of the weight of acetic acid combined in said ammonium acetate, so as to form acetonitrile by decomposition of ammonium acetate, and to distill off the acetonitrile as it is produced, and continuously supplying to the decomposition zone a mixture of ammonium acetate and free acetic acid, the free acetic acid being present in the latter mixture in an amount equal to 15 to 20% by weight of that combined in the ammonium acetate.

8. Process for the manufacture of acetonitrile, which comprises heating, in presence of an iron catalyst, a liquid reaction medium comprising ammonium acetate in admixture with a quantity of free acetic acid equal to 40-60% by weight of that combined in the ammonium acetate so as to form acetonitrile by decomposition of ammonium acetate and to distil off the acetonitrile as it is produced.

9. A continuous process for the manufacture of acetonitrile, which comprises heating, in the presence of an iron catalyst, a liquid reaction medium comprising ammonium acetate mixed with a quantity of free acetic acid equal to 20 to 50% of the weight of acetic acid combined in said ammonium acetate, so as to form acetonitrile by decomposition of ammonium acetate, and to distill off the acetonitrile as it is produced, and continuously supplying to the decomposition zone a mixture of ammonium acetate and free acetic acid, the free acetic acid being present in the latter mixture in an amount equal to 15 to 20% by weight of that combined in the ammonium acetate.

HORACE FINNINGLEY OXLEY.
EDWARD BOADEN THOMAS.